United States Patent Office 3,542,826
Patented Nov. 24, 1970

3,542,826
COBALT DODECENEDIOATE AND USE THEREOF
August J. Pacini, San Pedro, Calif., assignor to Purex Corporation, Ltd., Lakewood, Calif., a corporation of California
No Drawing. Filed Mar. 22, 1968, Ser. No. 715,167
Int. Cl. C07f *15/06;* C07c *57/02;* A61k *27/00*
U.S. Cl. 260—439                                               1 Claim

ABSTRACT OF THE DISCLOSURE

The cobalt salt of trans-dodecenedioic acid has been prepared and found to be a highly effective antiviral and vulnerary agent.

BACKGROUND OF THE INVENTION

Field of the invention

The invention is concerned with the cobalt salt of trans-dodecenedioic acid (TTA) and its use in the treatment of vulnerary and viral conditions.

Prior art

Aloe vera in its unextracted form has been used for centuries for its vulnerary therapeutic effectiveness, particularly against burns. TTA is obtainable by exhaustive extraction of *Aloe vera* or may be synthetically produced. The cobalt salt of TTA is a new compound.

SUMMARY OF THE INVENTION

It has now been discovered that the cobalt salt of TTA is vastly more effective than TTA or *Aloe vera* in treatment of burns, wounds, ulcers and various disorders of the skin inclusive of psoriasis and in exerting clinically helpful effectiveness in management of many viral diseases such as trachoma, herpetic kerattis, verruca and others.

DESCRIPTION OF THE PREFERRED EMBODIMENTS

Traumatic acid is also known as 1-decene-1,10-dicarboxylic acid and exists in cis and trans forms, the latter, hereinafter referred to as TTA, being the more biologically active.

TTA may be prepared as follows: Undecylenic acid is oxidized to hydroxyformoxyhendecanoic acid with hydrogen peroxide in formic acid which is then hydrolyzed to 10,11-dihydroxyhenedecanoic acid with sodium hydroxide. Treatment with periodic acid transforms the 10,11-dihydroxyhendecanoic acid into the sebacic semi-aldehyde which is condensed with malonic acid in the presence of pyridine. Upon acidification of the condensation mixture, 1-decene-1,10-dicarboxylic acid, i.e. traumatic acid, precipitates. This product is purified by recrystallization from a solvent. While the acid per se is biologically active, the cobalt salt is many times more active.

Salts of TTA are prepared by replacement of the carboxyl hydrogen with cobalt from a suitable metal salt, e.g. carbonate, acetate, chloride and the like, e.g. cobalt carbonate.

Quantities of traumatic acid or salt employed are typically quite small. Thus as little as 0.00005 percent are suitable.

The cobaltous TTA is applied topically in a suitable carrier e.g. liquids such as water, physiological saline, aqueous alcohol, or in ointments, salves, creams, lotions which are pharmaceutically acceptable and either inert or possessed of beneficial properties themselves.

Preparation of TTA

A one liter three-necked flask is equipped with a mechanical stirrer, a thermometer and a dropping funnel. In the flask are placed 184 g. (1 mole) of undecylenic acid and 200 g. (4.35 moles) of formic acid. The stirrer is started and the reaction mixture is warmed by a water bath to 40° C. for at least one-half hour longer after all the peroxide has been added.

The reaction mixture is transferred to a suitable flask for vacuum distillation and the formic acid and any water is removed by distilling under full vacuum of the water pump. The residual hydroxyformoxyhendecanoic acid is now ready for hydrolysis. This is accomplished by boiling for one hour and acidified to a pH of 2, or slightly lower with 6 N hydrochloric acid. After cooling well in an ice bath, the solid acid is collected on a Buchner funnel (prechilled), washed with ice water and sucked as dry as possible. The solid is dried in a vacuum desiccator over flake sodium hydroxide 205.0 g. of product equal to 93.92% of the theoretical yield were obtained.

A solution of 42.78 g. (0.2 mole) of sodium metaperiodate ($NaIO_4$) in 600 ml. of 1 N sulfuric acid is prepared. In a 1 liter flask equipped with a mechanical stirrer, a thermometer and a dropping funnel are placed 400 ml. of ethanol and 43.6 g. (0.2 mole) of 10,11-dihydroxyhenecanoic acid. This solution is warmed to 40° C. and the periodate solution is added through the separatory funnel at a rapid rate while stirring the mixture. The temperature is maintained at 40° C. for 30–40 minutes after which the solution is cooled to 20° C., and any inorganic salts that separated were collected on a Buchner funnel, sucked dry and washed with ether to remove adherent organic material.

The ether washing is used to extract the aqueous filtrate along with additional ether as may be needed. A total of three extractions with about 200 ml. of ether in each extraction should be used. The combined ether extract is shaken with a small amount of anyhdrous sodium sulfate to remove most of the water, after which the ether is distilled. The residual oil is then submitted to the full vacuum of a water pump to remove any alcohol and water remaining. An oily residue sebacic semi-aldehyde, weighing 3.0 g. is obtained. (96.77% of theoretical yield.) This product is used in the next step without further purification.

18.6 g. (0.1 mole) of the sebacic semi-aldehyde is mixed with 11.45 g. (0.11 mole) of malonic acid and 10.28 g. (0.13 mole) of pyridine in a 500 ml. round bottom flask. The mixture is allowed to stand for 24 hours at room temperature and then heated for 5 hours on a steam bath. The mixture is then cooled and diluted with about 10 volumes of water. Upon acidification to pH 2 with 2 N sulfuric acid and chilled to near 0° C., the crude 1-decene-1,10-dicarboxylic acid is collected on a Buchner funnel. It is sucked dry and washed with a small amount of ice cold water. Dry in a vacuum desiccator over flake caustic. The crude trans-1-decene-1,10-dicarboxylic acid, weighing 18.0 g., is recrystallized twice from boiling solvent. The yield is 11.49 g. (50.33% of theory).

The dicarboxylic acid obtained in this fashion has a molecular formula $C_{12}H_{20}O_4$, molecular weight 228.28, melts at 161°–165° C., when crystallized from ethyl acetate, contains an unsaturated linkage, is very sparingly soluble in water but fairly soluble in alcohol, ethyl acetate, benzol, chloroform, ether, glycerin, propylene glycol, is acid and shows a neutralization equivalent of 115, indicating dibasicity.

Similar acids to TTA have been identified by plant physiologists as among the many factors involved in plant growth phenomena, and numerous closely allied acids have been synthesized e.g. having formulas of the type

and

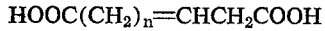

The following dicarboxylic acids failed to effect any acceleration of wound healing in experimentally induced wounds in rabbit ears over controls in opposite ears as opposed to the transdodecenedioic acid, which speeds up repair appreciably; 1-nonene-1,9-, 2-nonene-1,9-, 2-decene-1,10-, 1-tridacene-1,13-, and 2-tridecene-1,13-dicarboxylic acid. Nor do any of these dicarboxylic acids therapeutically affect hepetic keratitis induced in the eye of the rabbit by inoculation therein of herpes simplex virus, as opposed to dodecenedioic acid which is strikingly effective in the management of this condition as in other viral conditions (trachoma, verruca, and non-viral conditions such as psoriasis, wound healing, burns, among others).

It is clear that dicarboxylic acid substances known to be related to plant growth stimulation, of which there are many, and never before identified with the treatment of human animal diseases, are not therapeutically useful in the treatment of human and animal diseases, some viral, with the single exception of trans-dodecenedoic acid.

It is noteworthy that transdodecenedioic acid is the therapeutically effective in the treatment of diseases of humans and animals; that it exerts curative action in the case of several viral afflictions; that it is beneficial in the treatment of psoriasis and numerous skin conditions as well as exhibiting the vulnerary characteristics for which the aloe plant has been traditionally employed for centuries, an aid in the healing of wounds, burns, ulcers, contact dermatitis and other conditions; that it differs in this important respect from any other closely allied dicarboxylic acid analog recognized with dodecenedioic acid as a plant stimulant.

The cobalt salt of TTA is far more effective than TTA.

Preparation of TTA cobalt salt

Three hunderd milligrams of TTA were dissolved in 300 milliliters of boiling distilled water. An excess of cobalt carbonate, 250 milligrams, was added to the boiling solution, forming a pink-violet slurry. After 10 minutes of continued boiling, and filtering, the filtrate was evaporated to about 150 milliliters and let stand overnight. Two sets of crystals formed the first, on the bottom of the container, were long (1-3 millimeters) and ruby-red. The second set were colorless and floated on the filtrate liquid. The ruby-red crystals were separated by decanting the other crystals and filtrate and dried on unglazed porcelain. After recrystallization from distilled water, a yield of 90 milligrams of ruby-red powder was realized. Quantitative analysis revealed a cobalt content in the powder of 20.58%, in close agreement with a single cobalt salt of TTA (theor:20.593%).

Cobalt dodecendioate is therapeutically effective in microgram dose, whether applied topically in any convenient compatible formulation preferably free of inhibiting antimetabolites, or injected in solution form, or administered perorally, or included in rectal or vaginal suppository form, or as a micro- or other clysma.

A completely unpredicted effect of the salt is its action toward infections in animals and in humans of viral origin. In the treatment of experimentally induced herpetic keratitis the curative effectiveness of cobalt dodecendioate is many times more certain than the use of the acid.

EXAMPLES (A) It has been demonstrated that psoriatic scales recovered from an individual afflicted with the disorder contain considerably less free amino-nitrogen than the unblemished skin of a normal individual (A.M.A. Archives of Dermatology, 78:14, 1958), and that in the treatment of the disease, the free amino-nitrogen in the skin returns to more normal values as the condition responds favorably to therapy. Psoriatic scales are soaked in Duponol, the solution filtered and the filtrate treated with ninhydrin. Normal skin shows a strongly positive amino acid nitrogen reaction (purplish coloration) which is less intense and even practically negative in proportion as psoriasis remains untreated; but on satisfactory treatment, the free amino-nitrogen returns in psoriatic skin and approaches normal values as the lesions are dissipated and finally essentially disappear. The test can be quantitated by weighing the scales, preparing definite concentration of the test solutions, using definite volumes of the reagents and reading the color in any appropriate colorimeter. By this procedure lesions treated with cobaltous dodecenedioic acid disappear more promptly and their free amino-nitrogen content resumes normal values in many more cases of psoriasis than when treated with the free acid; and of great importance, a solution containing 5 milligrams of cobaltous dodecenedioic acid per milliliter of distilled water is effective in the treatment of psoriasis on the deep intramuscular injection of 1 milliliter amounts every other day, whereas the injection (as opposed to the topical application) of free dodecenedioic acid preparations do not produce similar clinical response in this disease.

(B) Similarly, the cobaltous salt of dodecenedioic acid yields more prompt results in more cases of herpetic keratitis with no recurrences in rabbits when injected intramuscularly than when topically instilled into the eye, suggesting that the dormant occluded virus is attacked by systemic administration as opposed to topical instillation.

(C) Clinically, the following conditions have given completely satisfactory responses amounting to "cures" in occasional instances of the diseases mentioned, in every other instance the cobaltous salt of the acid exhibiting uniformly more prompt responses, in more cases and nearly always greatly more complete regression in such conditions, such as psoriasis, that are refractory to treatment and quite frequently recur: In humans; unindurated acne, neurodermatitis, seborrheic dermatitis, psoriasis, first and second degree burns however produced, and in suppository or other intravaginal and rectal application for the relief of pruritus which responds effectively to the free acid or to its cobaltous salt. In animals; various forms of chronic infections such as canine pyometritis, ulcerations of various origins and other conditions.

(D) Cobalt dodecenedioate is uniquely effective in animals and humans infected with viruses. It may be instilled in the eye where herpetic keratitis is present, but it is successfully administered by intramuscular injection which occasions favorable response in trachoma, herpetic keratitis, verruca and molluscum contagiosum and the subclinical features of the widely prevalent enterovirus group of intestinal disorders that usually remain symptomatic in children under 5 years of age but exhibit detectable clinical disturbance above this age.

Copper and zinc present so as to combine with the acid lessen its therapeutic effectiveness, but cobalt uniquely enhances it and confers upon it still greater effectiveness in the management of numerous virus infections, by which property the cobalt salt is distinguished from the free acid (TTA) or any other salt (sodium, potassium, copper, zinc and manganese which are practically inactive on injection). In the treatment of virus diseases when injected in amounts of the order of a few micrograms per milliliter of saline, one such milliliter dose administered by intramuscular injection daily, at intervals of every second day or as the judgment of the clinician dictates. Cobalt TTA is appropriately suited for the formulation of all usual forms of medical administration, e.g. in ointments, lotions, dispersed through talc as a dusting powder, made into vaginal or rectal suppositories and in sterile saline solution for intramuscular injection.

Aside from its use alone, either the cobalt TTA may be used in admixture with other medication and presented in the form of soaps, ointments, lotions and such other forms as are common to the dispensation of drug and medicated cosmetic formulations.

I claim:
1. Cobaltous salt of transtraumatic acid.

References Cited

UNITED STATES PATENTS 2,339,259  1/1944  English et al. ------- 260—535

OTHER REFERENCES

Noller: Chemistry of Organic Compounds, W. B. Saunders Co., Philadelphia, 1965, p. 181.

TOBIAS E. LEVOW, Primary Examiner

A. P. DEMERS, Assistant Examiner

U.S. Cl. X.R.

260—537; 424—295